(No Model.)
E. WESTON.
APPARATUS FOR REGULATING AND CONTROLLING THE ELECTRICAL TRANSMISSION OF POWER.
No. 289,198. Patented Nov. 27, 1883.
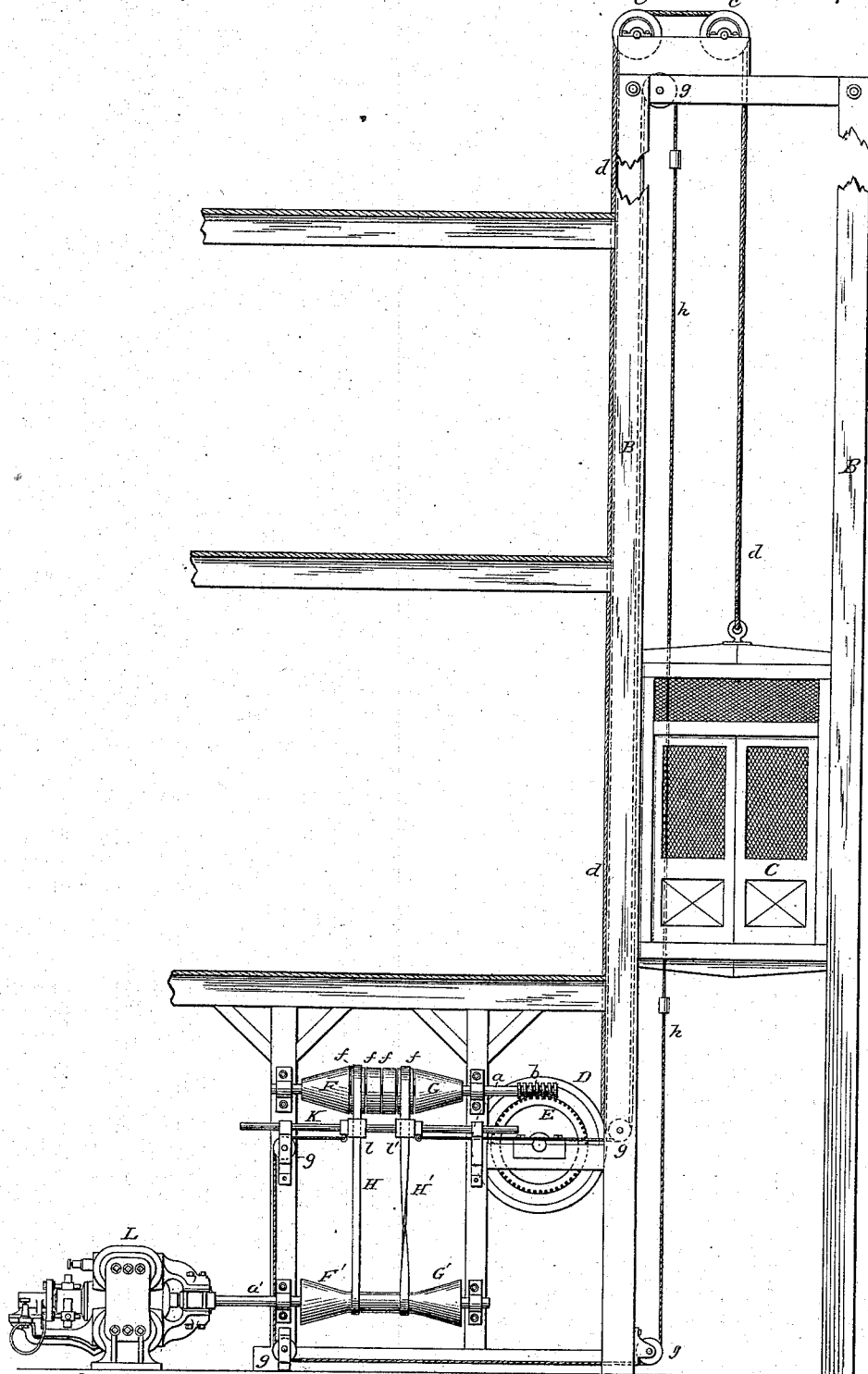

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

APPARATUS FOR REGULATING AND CONTROLLING THE ELECTRICAL TRANSMISSION OF POWER.

SPECIFICATION forming part of Letters Patent No. 289,198, dated November 27, 1883.

Application filed June 5, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Apparatus for Regulating and Controlling the Electrical Transmission of Power, of which the following is a specification, reference being had to the drawing accompanying and forming a part of the same.

My invention relates to apparatus for regulating and controlling the electrical transmission of power in systems or combinations wherein an electro-magnetic motor is employed to drive or move rotating, rolling, or moving devices of any description.

The nature and objects of my invention will be described by reference to the accompanying drawing, which illustrates a special application of the same to elevators or hoisting apparatus, and the general uses and applicability of the invention to other and analogous purposes will be thereafter pointed out and its scope defined.

Referring to the drawing, which represents a portion of a building, an elevator shaft and car, an electro-magnetic motor, and apparatus for transmitting the motion of the same to the car, A A' A² designate the several floors of the building; B B, an elevator-shaft or the guides or ways in which it moves; C, a car; D, the winding-drum; $d\ d$, the cable or cables for raising the car; and $c\ c$ the usual pulley-wheels over which the cables run.

Fixed to the shaft of the winding-drum D is a toothed wheel, E, with which meshes an endless screw, $b$, on a shaft, $a$. The pitch of this screw should be so short as to lock the drum against independent motion, so that whatever the tension on the cables $d$ may be the elevator will not descend unless the drum D be turned by the screw $b$. I may, however, employ any other suitable locking or brake mechanism for accomplishing this purpose. On the shaft $a$ are two conical pulleys, F G, with their smaller ends turned toward the ends of the shaft. Between the cone-pulleys are a number—say four—of loose pulleys or disks, $f\ f$. Below the shaft $a$ is a second shaft, $a'$, carrying two conical pulleys, F' G', in vertical line with the pulleys F G, but turned in opposite directions—that is, with their wider ends toward the ends of the shaft. The space between the smaller ends is filled with a long flat pulley or an enlargement of the shaft, equal in diameter throughout to the smallest portion of pulleys F' G'. Two belts pass over the two sets of pulleys—one, as H', being twisted, so as to impart to the shaft $a$ a motion the reverse of that imparted by the other, H. The shaft $a'$ is an extension of, or is in any way driven by, the shaft of an electro-magnetic motor, L, which receives current from a suitable source of electricity. A cord, $h$, is carried through the elevator from end to end of the elevator-shaft, at which points it runs over pulleys $g\ g$, and is taken to the framework supporting the motion-transmitting devices. There the two ends of the cord are connected to a belt-shifter, which in the present instance consists of a sliding bar, K, having two sets of fingers or similar devices, $l\ l'$, fixed to it, that inclose the belts and shift them off or onto the different pulleys of the two shafts, according to the direction in which the cord $h$ is drawn by a person in the elevator-car.

The functions and mode of operation of these devices are as follows: The motor L is connected with a circuit from a constant source of current, and, assuming the belts to be in the position shown in the figure, it therefore revolves unimpeded by any other load than friction until it has attained a speed at which the counter electro-motive force developed by it approaches the electro-motive force developed by the generator, or, in other words, until but little current flows into it.

It has been before pointed out by me that to permit the motor to vary its speed inversely as the load imposed upon it is the most economical and effective way of regulating the current transmitted and the power expended in producing it. By the arrangement of mechanism which I have here employed this end is attained. A still greater advantage is secured in the present case, and generally in all similar cases when any considerable amount of power is to be transmitted by electric motors, in that it avoids breaking the circuit, which would be impracticable where very powerful currents are used, or shifting the brushes, which, under like circumstances, would be fatal to the machines. During the time that the elevator is stationary the motor is allowed to run free, and in consequence attains its highest rate of speed. To start the elevator in motion upward, the cord $h$ is pulled down, by which means the belt H' is drawn over onto the smaller end of the pulley G' and the larger end of pulley G, which sets the car in motion by winding up its cables on the drum.

The special arrangement of pulleys described is productive of most important results, in that it connects the motor with the driven shaft at a time when it is receiving the minimum current, and under conditions in which it will have the greatest mechanical advantage; and, secondly, it avoids a sudden starting of the car, as the motion transmitted from the smaller end of pulley G is very greatly reduced. To stop the car in its ascent, the cord $h$ is held until the belt H' is shifted off onto the loose pulleys of shaft $a$. In passing over the pulleys G G' toward the loose pulleys, the belt H' increases the mechanical advantage of the motor, and consequently its speed, so that just as the belt finally leaves the pulleys G G' the motor has attained nearly its maximum rate of speed. It will be observed that an increase in the rate of speed of the motor under these circumstances does not accelerate the speed of the driven shaft, the latter, on the contrary, slowing up as the motor runs faster.

To lower the car, the cord $h$ is drawn up and the belt H shifted over onto the pulleys F F', whereby the drum is turned in an opposite direction and the cables unwound, the effect produced by the pulleys F F' upon the action and effect of the motor in the descent of the car being similar to that produced by the pulleys G G'.

The construction and arrangement of motion-transmitting devices which I have now described will be seen to exhibit certain marked features of novelty and to possess certain advantages over the ordinary means heretofore employed.

First: The motion-transmitting devices permit the motor to run at varying speeds with reference to the driven shaft or machine, and to run unimpeded when not connected with said shaft or machine. By this the system is made available for doing work on a large scale, and is more easily regulated and controlled.

Secondly. The motion-transmitting devices, while permitting the motor to run at varying speeds with reference to the driven shaft or machine, are also capable of reversing the direction of the motion imparted. This greatly extends the range of utility of the system, rendering it applicable to many purposes, such as the raising and lowering of heavy hoisting apparatus, the propulsion of tram-cars, and the like.

Thirdly. The motion-transmitting mechanism is so constructed and arranged that the operation of checking or arresting the motion of the driven machine, effected by disconnecting the motor therefrom, gradually increases the mechanical advantage of the motor, so that when the two are finally disconnected the motor will be doing but little work, and consequently running at a relatively high speed. In this way sudden racing of the motor is prevented, and the driven machine brought gradually to a standstill.

Fourthly. The motor and driven machine can be brought into connection only when the former is doing the least work and has the greatest mechanical advantage, so that the driven machine is started in motion gradually, and sudden shocks are avoided.

Certain other novel and useful features result from the combination of belts and pulleys hereinbefore described, among which is the fact that the slowing down, stoppage, reversal, and speeding up again of the driven shaft or machine may be effected by a simple movement in one direction of the belts or devices controlling the position of the same. This, in certain applications of the system, becomes a highly-important feature.

What has now been shown and described as applicable to a special case—that is, to raising and lowering an elevator-car—holds equally true for a variety of other mechanisms. For example, the shaft $a$, in lieu of turning the drum of an elevator, might be, or be geared with, the shaft or spindle of any cutting, drilling, or similar mechanism, the axle of a tram-car, or the like. In all such cases many or all of the same conditions exist that are met with in the present system, and it is obvious from the nature of the case that the invention is not restricted to the specific devices herein shown, but includes all combinations of mechanism constructed or arranged for producing the same results in an equivalent manner.

Inasmuch as the system here described may be applied to such other purposes as are above mentioned more effectively by the addition of certain elements and special arrangements of the parts, I intend making the same subject of other applications for Letters Patent; and I would also state that I do not relinquish the right to those features of novelty herein shown and described but not claimed, but reserve the right to make the same the subject of other applications.

What I now claim as my invention is—

1. The combination, with an electro-magnetic motor adapted to run in one direction, and a shaft driven thereby, of intermediate motion-transmitting and reversing mechanism arranged and operating to rotate the driven shaft in one direction or the other at will, and also to vary the speed of the motor with reference to the driven shaft, irrespective of the direction of rotation of the latter, substantially as and for the purposes hereinbefore set forth.

2. The combination, with an electro-magnetic motor and a driven shaft, of intermediate motion-transmitting mechanism capable of varying the mechanical advantage of the motor in driving the shaft, and means for disconnecting the motor from the driven shaft, arranged and operating to effect in so doing an increase in the mechanical advantage, and consequently the speed, of the motor, all as set forth.

3. The combination, with an electro-magnetic motor and a driven shaft, of intermediate motion-transmitting mechanism capable of varying the mechanical advantage of the motor in driving the shaft, and means for controlling the motion-transmitting mechanism, arranged and operating in such manner that the motor and driven shaft can be brought into connection only under conditions in which the mechanical advantage of the motor is greatest, as set forth.

4. In a system for the transmission of power, the combination of an electric-motor shaft, a fixed pulley having conical and cylindrical portions, a driven shaft, fixed conical and loose cylindrical pulleys carried thereby, and an adjustable connection between the pulleys on the two shafts, as and for the purpose specified.

5. In a system for the transmission of power, the combination of an electric-motor shaft, a fixed pulley having a cylindrical central and conical end portions, a driven shaft, two fixed conical and two or more intermediate loose pulleys thereon, and adjustable connections between the two systems of pulleys, for transmitting, varying, and reversing the motion of the same, substantially as set forth.

6. In a system for the transmission of power, the combination of an electric-motor shaft, a fixed pulley having a cylindrical central and conical end portions, a driven shaft, two fixed conical and two or more intermediate loose pulleys thereon, belts running over the pulleys, and means for shifting the belts, these parts being constructed and arranged in substantially the manner set forth.

7. The combination, with a body such as an elevator or other car, of an electro-magnetic motor adapted to run in one direction, intermediate motion-transmitting and reversing mechanism between the motor and car, constructed or arranged to vary the speed of the motor with reference to that of the car, and means for controlling the action or effect of the motion-transmitting devices, all substantially as herein set forth.

8. The combination, with an elevator-car, supporting-cables, winding-drum, and means for locking the same against independent movement, of an electro-magnetic motor adapted to run in one direction, means for transmitting the motion of the same to the drum in either direction, and means for varying and controlling the action or effect of the motion-transmitting devices from the car, all substantially as set forth.

9. The combination, with a body such as an elevator or other car, of an electro-magnetic motor, intermediate motion-transmitting and reversing mechanism between the motor and car, and a device for controlling the action or effect of the motion-transmitting mechanism, these parts being constructed and combined in substantially the manner herein set forth, whereby a movement of the controlling device in one direction may retard, check, reverse, and accelerate the motion imparted from the motor to the car.

In testimony whereof I have hereunto set my hand this 31st day of May, 1883.

EDWARD WESTON.

Witnesses:
W. FRISBY.
W. H. DOGGETT.